US008751388B1

(12) United States Patent
Chapa et al.

(10) Patent No.: US 8,751,388 B1
(45) Date of Patent: Jun. 10, 2014

(54) SYSTEM AND METHOD OF DELAYED BILLING FOR ON-DEMAND PRODUCTS

(71) Applicant: CSIdentity Corporation, Austin, TX (US)

(72) Inventors: Isaac Chapa, Austin, TX (US); Steven Hatley, Austin, TX (US); Joe Ross, Austin, TX (US)

(73) Assignee: Csidentity Corporation, Austin, TX (US)

( * ) Notice: Subject to any disclaimer, the term of this patent is extended or adjusted under 35 U.S.C. 154(b) by 0 days.

(21) Appl. No.: 13/870,489

(22) Filed: Apr. 25, 2013

Related U.S. Application Data

(60) Provisional application No. 61/786,585, filed on Mar. 15, 2013.

(51) Int. Cl.
*G06Q 40/00* (2012.01)
*G06Q 30/04* (2012.01)

(52) U.S. Cl.
CPC .................................... *G06Q 30/04* (2013.01)
USPC ......................................................... 705/40

(58) Field of Classification Search
CPC .................................................... G06Q 30/04
USPC ..................................................... 705/35–45
See application file for complete search history.

(56) References Cited

U.S. PATENT DOCUMENTS

| 7,340,042 B2 | 3/2008 | Cluff et al. |
| 7,552,123 B2 | 6/2009 | Wade et al. |
| 8,229,810 B2 | 7/2012 | Butera et al. |
| 8,359,278 B2 | 1/2013 | Domenikos et al. |
| 2008/0208752 A1* | 8/2008 | Gottlieb et al. ................. 705/51 |
| 2008/0270299 A1 | 10/2008 | Peng |
| 2009/0106846 A1* | 4/2009 | Dupray et al. .................. 726/26 |
| 2010/0058404 A1* | 3/2010 | Rouse ............................. 725/93 |
| 2010/0205662 A1 | 8/2010 | Ibrahim et al. |
| 2010/0293090 A1 | 11/2010 | Domenikos et al. |
| 2011/0260832 A1 | 10/2011 | Ross et al. |
| 2012/0215758 A1 | 8/2012 | Gottschalk, Jr. et al. |
| 2012/0303514 A1 | 11/2012 | Kasower |
| 2012/0331557 A1* | 12/2012 | Washington ................... 726/26 |

\* cited by examiner

*Primary Examiner* — Thomas M Hammond, III
(74) *Attorney, Agent, or Firm* — Winstead PC

(57) ABSTRACT

In one embodiment, a method includes receiving a binding request for an on-demand identity product from a consumer. The method also includes attempting to provide the on-demand identity product. The method further includes, responsive to the binding request, ascertaining delayed-billing settings that are applicable to the on-demand identity product. In addition, the method includes delaying billing of the on-demand identity product until it can be confirmed that the identity-product provision system has complied with the delayed-billing settings.

14 Claims, 3 Drawing Sheets

SYSTEM AND METHOD OF DELAYED BILLING FOR ON-DEMAND PRODUCTS

CROSS-REFERENCE TO RELATED APPLICATIONS

This patent application claims priority from, and incorporates by reference the entire disclosure of, U.S. Provisional Patent Application No. 61/786,585.

BACKGROUND

1. Technical Field

The present invention relates generally to billing and more particularly, but not by way of limitation, to systems and methods of delayed billing for on-demand products.

2. History of Related Art

Numerous computer systems exist that provide on-demand products to consumers. For purposes of this patent application, an on-demand product is a product that is requested by a consumer and is intended by a provider to be delivered in real-time or in near real-time. On-demand products are generally requested electronically over a communications network such as, for example, public or private intranets, a public switched telephone network (PSTN), a cellular network, the Internet, or the like. Examples of on-demand products include content such as, for example, text, graphics, photos, video, audio, code, software applications, documents, access to cloud applications, and the like. On-demand products can also include content streaming, for example, of video, audio, and the like. By way of further example, on-demand products may include services such as, for example, identity-monitoring services. In general, on-demand products are not, inter alia, physically shipped or delivered. Rather, on-demand products are typically delivered electronically over a communications network or by initiating a requested service.

Traditionally, systems that provide on-demand products bill for the on-demand product soon after a consumer has made a binding request for the on-demand product, for example, by requesting or enrolling for the on-demand product and providing payment information. When various complexities cause the on-demand product to not be delivered, a consumer is usually still charged for the on-demand product. As consumer-protection laws and regulations proliferate worldwide, such billing practices can carry significant risk.

SUMMARY OF THE INVENTION

In one embodiment, a method includes, on an identity-product provision system comprising at least one server computer, receiving a binding request for an on-demand identity product from a consumer. The method also includes the identity-product provision system attempting to provide the on-demand identity product. The method further includes the identity-product provision system ascertaining delayed-billing settings that are applicable to the on-demand identity product. In addition, the method includes the identity-product provision system delaying billing of the on-demand identity product until it can be confirmed that the identity-product provision system has complied with the delayed-billing settings.

In one embodiment, an identity-product provision system includes at least one server computer. The at least one server computer is operable to perform a method. The method includes receiving a binding request for an on-demand identity product from a consumer. The method also includes attempting to provide the on-demand identity product. The method further includes ascertaining delayed-billing settings that are applicable to the on-demand identity product. In addition, the method includes delaying billing of the on-demand identity product until it can be confirmed that the identity-product provision system has complied with the delayed-billing settings.

In one embodiment, a computer-program product includes a computer-usable medium having computer-readable program code embodied therein. The computer-readable program code adapted to be executed to implement a method. The method includes receiving a binding request for an on-demand identity product from a consumer. The method also includes attempting to provide the on-demand identity product. The method further includes ascertaining delayed-billing settings that are applicable to the on-demand identity product. In addition, the method includes delaying billing of the on-demand identity product until it can be confirmed that the identity-product provision system has complied with the delayed-billing settings.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, on-demand products can be more efficiently provided and billed for by implementing systems and methods outlined herein. In a typical embodiment, a product-provision system is operable to configurably delay when consumers are billed for on-demand products in accordance with delayed-billing settings. As used herein, delayed-billing settings refer to one or more sets of criteria for determining whether a consumer can be billed for an on-demand product at a given point in time. As used herein, a consumer is a person or group of persons who are requestors and/or users of on-demand products.

For purposes of this patent application, providing or delivering an on-demand product refers to automated actions by a computer system to fulfill a request for the on-demand product. For example, for various types of on-demand products, providing or delivering the on-demand products can include transmitting, streaming, or initializing the on-demand product. For various types of on-demand products, providing or delivering the on-demand products can also include, for example, making the on-demand products accessible to consumers for transmission or streaming thereto.

For purposes of this patent application, billing refers to initiating payment extraction via provided payment information. Billing can include, for example, charging a credit line (e.g., a credit card), initiating a bank draft, applying a credit, debiting an account, or the like. Billing can also include, for example, authorizing a third-party to charge a credit line, initiate a bank draft, apply a credit, debit an account, or the like.

Figure 1:
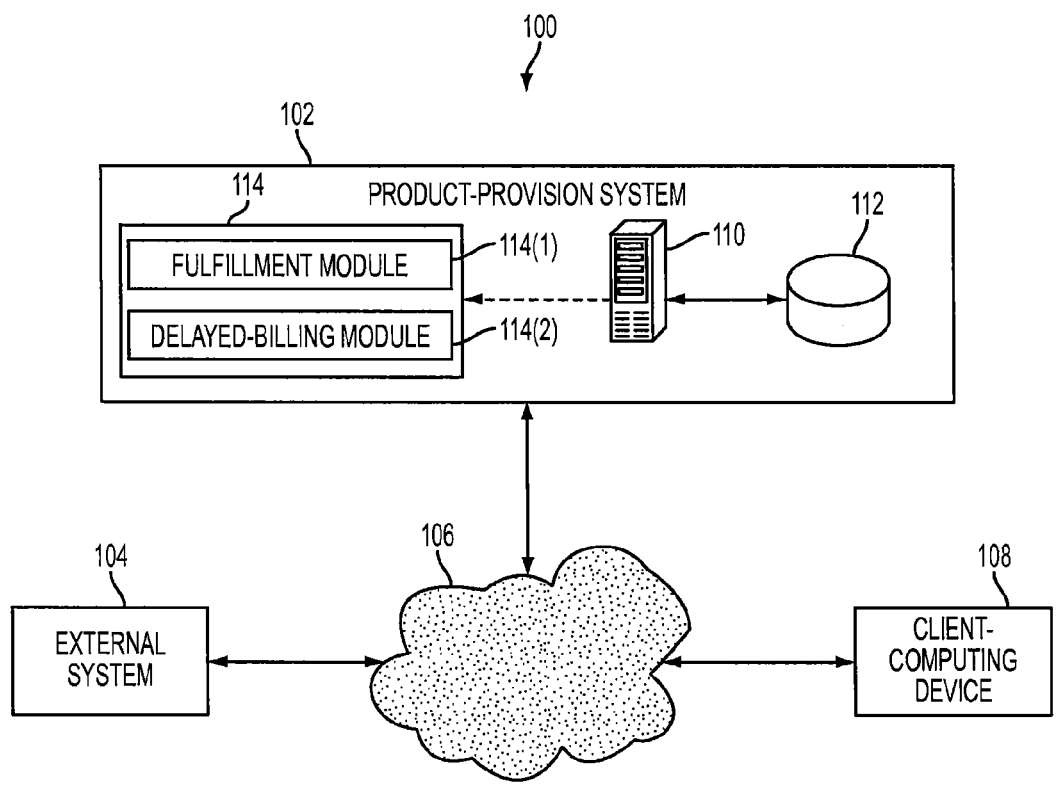
FIG. 1 illustrates a system that can be used for on-demand-product provision and billing.

FIG. 1 illustrates a system 100 that can be used for on-demand-product provision and billing. The system 100 includes a product-provision system 102, one or more external systems 104, and one or more client-computing devices 108. The product-provision system 102 includes at least one server computer 110 communicably coupled to one or more databases 112. The product-provision system 102 is operable to communicate with the one or more external systems 104 and the one or more client-computing devices 108 over a network 106.

The product-provision system 102 is shown to include the at least one server computer 110 and the one or more databases 112 for illustrative purposes. One of ordinary skill in the art will appreciate that each instance of a computer such as, for example, the at least one server computer 110, may be representative of any number of physical or virtual server computers. Likewise, each instance of a database such as, for example, the one or more databases 112, may be representative of a plurality of databases. Moreover, each instance of a system such as, for example, the product-provision system 102 and the one or more external systems 104, may be representative of any combination of computing equipment including, for example, any number of physical or virtual server computers and any number and organization of databases. In addition, it should be appreciated that, in various embodiments, the network 106 can be viewed as an abstraction of multiple distinct networks via which the product-provision system 102 is operable to communicate. For example, the network 106 can include one or multiple communications networks such as, for example, public or private intranets, a public switched telephone network (PSTN), a cellular network, the Internet, or the like.

In a typical embodiment, the product-provision system 102 is operable to provide the on-demand products to consumers and implement delayed billing for the on-demand products. The functionality of the product-provision system 102 is facilitated by a plurality of software modules 114 resident and executing on the at least one server computer 110. The plurality of software modules 114 includes a fulfillment module 114(1) and a delayed-billing module 114(2).

The fulfillment module 114(1) logically encapsulates software that is operable to generate, acquire, and/or provide the on-demand products to consumers. The on-demand products provisioned via the fulfillment module 114(1) may be selected from a number of categories such as, for example, text, graphics, photos, video, audio, code, software applications, documents, access to cloud applications, and the like. The on-demand products can also include content streaming, for example, of video, audio, and the like. By way of further example, on-demand products may include services such as, for example, monitoring services. Other examples of on-demand products will be apparent to one of ordinary skill in the art after reviewing the inventive principles contained herein.

The delayed-billing module 114(2) logically encapsulates software that maintains and enforces delayed-billing settings. The delayed billing settings may be maintained in the one or more databases 112. In various embodiments, the delayed-billing settings may be varied for particular categories of on-demand products. For example, streaming music may be subject to different settings than a credit-monitoring service. In various embodiments, the delayed-billing settings may be established by consumers, administrators, a provider or vendor for particular on-demand products, or the like.

The delayed-billing settings can take various forms. For example, the delayed-billing settings can include consumer-authentication criteria. In various embodiments, the consumer-authentication criteria may require that all or part of a given consumer's personally identifying information (PII) be verified as correct prior to billing. PIT, as used herein, refers to information that can be used to uniquely identify, contact, or locate an individual person or can be used with other sources to uniquely identify, contact, or locate an individual person. PIT may include, but is not limited to, social security numbers (SSN), bank or credit card account numbers, passwords, birth dates, and addresses. Verification of PII can involve, for example, validating the consumer's PII against other records such as, for example, a credit file, public records, and the like. In various embodiments, the consumer-authentication criteria may further require that the consumer be authenticated as an owner of the PII. Examples of authentication that may be required are described in U.S. Pat. No. 7,340,042 and U.S. patent application Ser. No. 13/093,664. U.S. Pat. No. 7,340,042 and U.S. patent application Ser. No. 13/093,664 are hereby incorporated by reference.

By way of further example, the delayed-billing settings can include delivery-verification criteria. The delivery-verification criteria typically require that delivery of the on-demand products be verified before billing occurs. What constitutes delivery of an on-demand product is generally product-specific. Therefore, in a typical embodiment, a product-delivery definition is established relative to each category of on-demand product for which delivery is deemed different. The product-delivery definition may include, for example, one or more product-delivery factors that can be evaluated by the delayed-billing module 114(2) as true or false.

In a typical embodiment, the delayed-billing module 114(2) represents a significant departure from how product-provision systems traditionally bill consumers for on-demand products. Because on-demand products are generally intended to be provided immediately, it is usually desirable to bill immediately. However, in various embodiments, technical and practical issues can unpredictably arise that prevent a particular on-demand product from being provided to a particular consumer. In a typical embodiment, the delayed-billing module 114(2) detects such issues via the delayed-billing settings and acts to delay billing until it can be confirmed that the product-provision system 102 has complied with the delayed-billing settings. An example of a delayed-billing process that may be implemented by the delayed-billing module 114(2) will be described with respect to FIG. 3.

Although the fulfillment module 114(1) and the delayed-billing module 114(2) are depicted as two separate software components, in various other embodiments, such software components are organized differently. For example, the fulfillment module 114(1) and the delayed-billing module 114(2) could be merged into a single software component, each be further divided into other software components, or have their collective functionality allocated differently among any number of software components.

The one or more client-computing devices 108 are computer systems used by consumers, for example, to request and/or receive the on-demand products. The one or more client-computing devices 108 can include, for example, desktop computers, laptop computers, tablet computers, smart phones, and the like. The one or more external systems 104 are representative of computer systems from which the product-provision system 102 is operable to interact. For example, in various embodiments, the product-provision system may acquire particular on-demand products from the one or more external systems 104 or obtain information or data necessary to generate particular on-demand products. For example, the one or more external systems 104 may provide the information or data via an application programming interface (API).

In operation, the product-provision system 102 interacts with the plurality of client-computing devices 108 to receive binding requests for on-demand products. A binding request, as used herein, refers to a request for an on-demand product for which a requesting consumer has authorized fulfillment and provided payment information (optionally as part of the request). Upon receipt of a binding request for an on-demand product, the at least one server computer 110 utilizes the fulfillment module 114(1) to attempt to provide the requested on-demand product. Optionally in parallel, the at least server computer 110 initiates the delayed-billing module 114(2) so that payment can be extracted in accordance with the delayed-billing settings.

As described above with respect to FIG. 1, principles described herein can be applied to numerous categories of on-demand products. For illustrative purposes, examples will now be described with respect to on-demand identity products. An on-demand identity product, as used herein, is an on-demand product as defined above that may be used to facilitate discovery or prevention of identity theft. Identity theft generally involves a use of PII that is not authorized by an owner of the PII and can include, for example, an unauthorized change to PII or an unauthorized use of PII to access resources or to obtain credit or other benefits.

Identity products can include, for example, credit products. For purposes of this patent application, a credit product is an on-demand identity product as defined above that pertains to receiving, acquiring, reporting on, monitoring, or otherwise acting upon information related to consumer credit files. On-demand identity products that are not credit products may be referenced herein as non-credit products. Non-credit products can include monitoring and/or reporting services relating, for example, to exchanges of PII over the Internet, aliases associated with social-security numbers, sex-offender registries, payday loans, changes of address, and the like.

Figure 2:
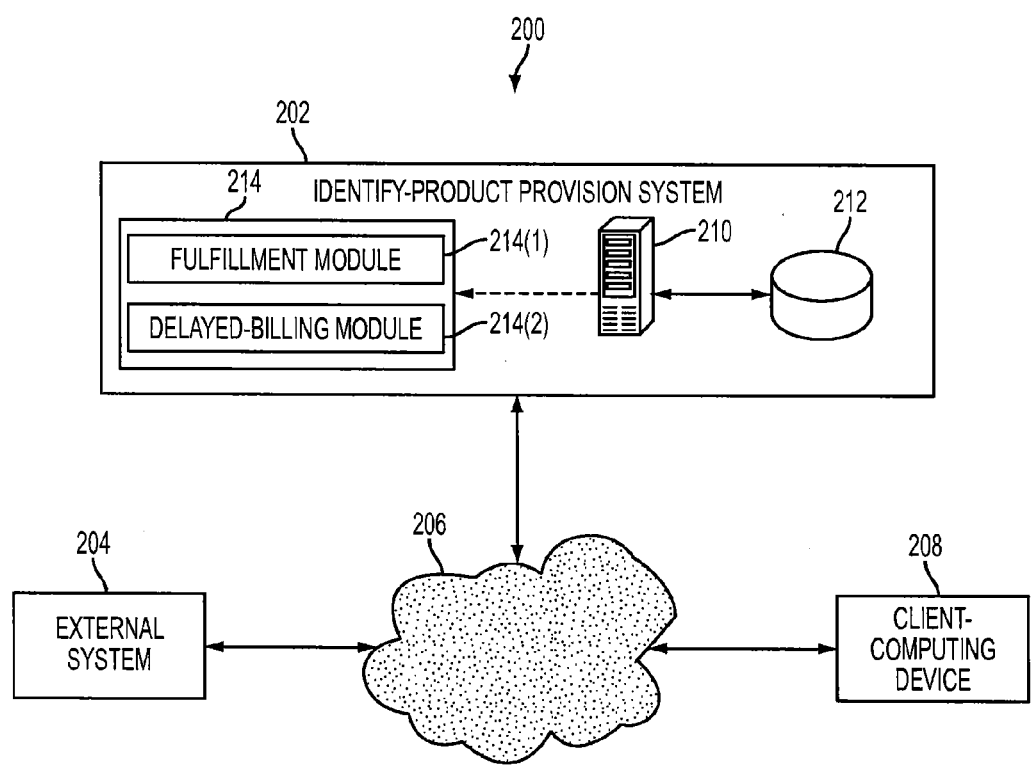
FIG. 2 illustrates a system that can be used for provision and billing of on-demand identity products.

FIG. 2 illustrates a system 200 that can be used for provision and billing of on-demand identity products. The system 200 includes an identity-product provision system 202, one or more external systems 204, and one or more client-computing devices 208. The identity-product provision system 202 includes at least one server computer 210 communicably coupled to one or more databases 212. The identity-product provision system 202 is operable to communicate with the one or more external systems 204 and the one or more client-computing devices 208 over a network 206. The at least one server computer 210 has a plurality of software modules 214 resident and executing thereon. The plurality of software modules 214 includes a fulfillment module 214(1) and a delayed-billing module 214(2).

In general, the identity-product provision system 202, the one or more external systems 204, the network 206, the one or more client-computing devices 208, the at least one server computer 210, the one or more databases 212, and the plurality of software modules 214 operate as described with respect to the product-provision system 102, the one or more external systems 104, the network 106, the one or more client-computing devices 108, the at least one server computer 110, the one or more databases 112, and the plurality of software modules 114, respectively, of FIG. 1. More specifically, however, the identity-product provision system 202 is operable to provide the on-demand identity products to consumers and implement delayed billing for the on-demand identity products.

In particular, the fulfillment module 214(1) logically encapsulates software that is operable to generate, acquire, and/or provide the on-demand identity products to consumers. The provided on-demand identity products can include, for example, reports and monitoring services. Examples of functionality that the fulfillment module 214(1) can encapsulate is described in detail in U.S. Pat. No. 8,359,278 and in U.S. patent application Ser. Nos. 12/780,130, 13/093,664, and 13/398,471. U.S. Pat. No. 8,359,278 and U.S. patent application Ser. Nos. 12/780,130 and 13/398,471 are hereby incorporated by reference. U.S. patent application Ser. No. 13/093,664 has already been incorporated by reference above.

The delayed-billing module 214(2) logically encapsulates software that maintains and enforces delayed-billing settings. The delayed billing settings may be maintained in the one or more databases 212. For example, the delayed-billing settings can include consumer-authentication criteria as described with respect to FIG. 1. Because the on-demand identity products generally involve PII and are thus sensitive in nature, the consumer-verification criteria typically takes on particular importance. For example, in a typical embodiment, identity products cannot be provided when a requesting consumer has not been authenticated. In such cases, it is often determined that the requesting consumer should not be billed. Therefore, the delayed-billing settings can serve as a safeguard to delay billing under such circumstances.

In a typical embodiment, the delayed-billing settings can also include delivery-verification criteria as described with respect to FIG. 1. In a typical embodiment, what constitutes delivery of an on-demand product may be varied between credit and non-credit products. For example, for a credit product, the delayed-billing settings may require, as a delivery-verification factor, that an acknowledgement be received back from one or multiple credit bureaus (e.g., Experian, TransUnion, and Equifax in the U.S.). By way of further example, for a non-credit product, the delayed-billing settings may require, as a delivery-verification factor, that the consumer has been successfully added to receive a service such as, for example, an identity-monitoring service, coordinated by the fulfillment module 214(1). In various embodiments, technical issues such as, for example, incomplete or inaccurate information from the consumer, may prevent the consumer from being successfully added to receive a service. In this fashion, the delayed-billing module 214(2) can utilize the delayed-billing settings to detect the technical issues and delay billing.

In operation, the identity-product provision system 202 interacts with the plurality of client-computing devices 208 to receive binding requests for on-demand products. The binding requests can result, for example, from enrollment as described in U.S. patent application Ser. No. 13/093,663 or from registration and/or subscription as described with respect to U.S. Pat. No. 8,359,278 (each of which is incorporated by reference above). Upon receipt of a binding request for an on-demand identity product, the at least one server computer 210 utilizes the fulfillment module 214(1) to provide the requested on-demand identity product. Optionally in parallel, the at least server computer 210 initiates the delayed-billing module 214(2) so that payment can be extracted in accordance with the delayed-billing settings.

Figure 3:
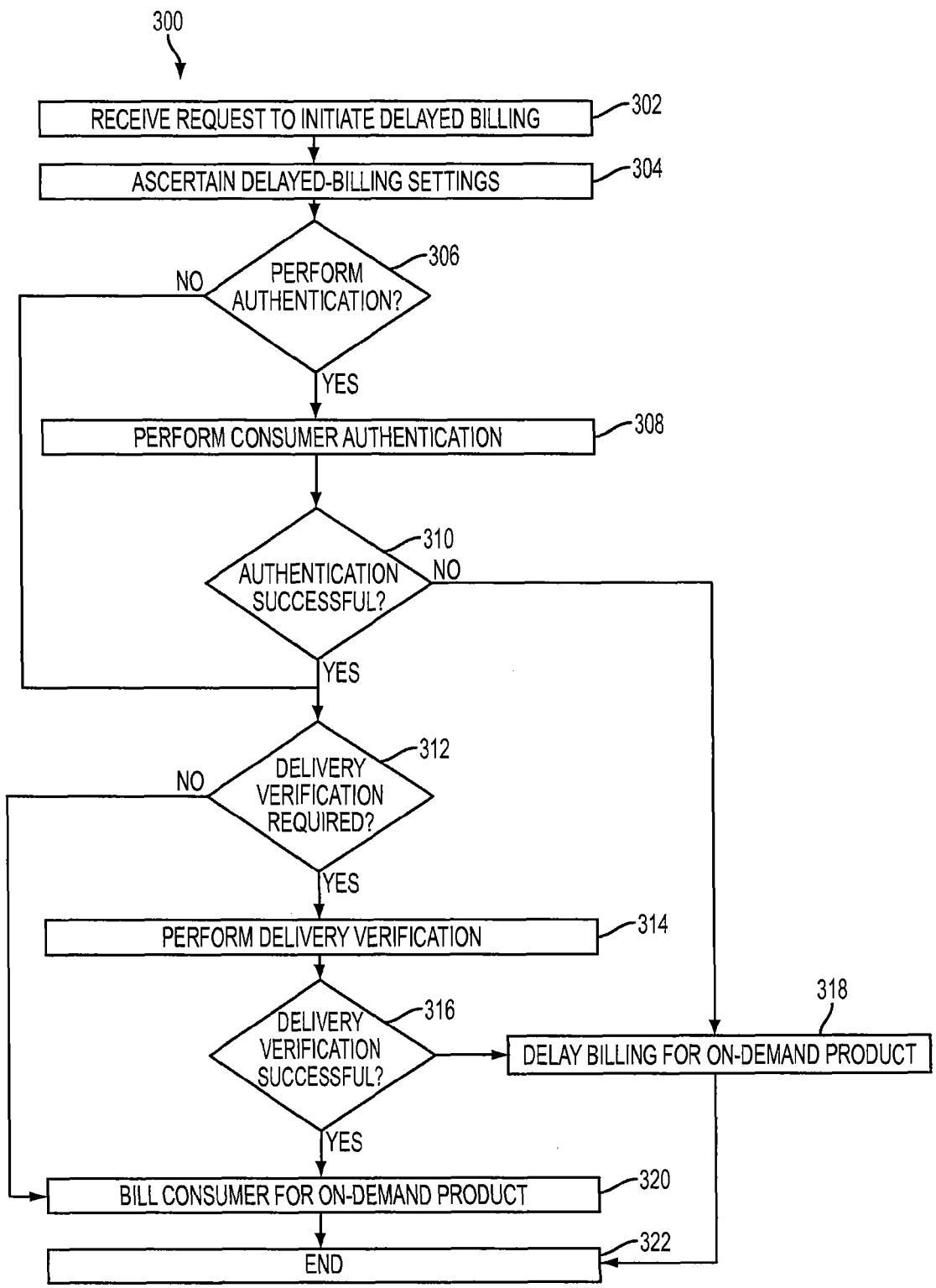
FIG. 3 illustrates a process for delayed billing.

FIG. 3 illustrates a process 300 for delayed billing. The process 300 may be performed by a delayed-billing module such as, for example, the delayed-billing module 114(2) of FIG. 1 or the delayed-billing module 214(2) of FIG. 2. The delayed-billing module is typically resident and executing on a server computer such as, for example, the at least one server computer 110 of FIG. 1 or the at least one server computer 210 of FIG. 2. The process 300 begins at step 302.

At step 302, the delayed-billing module receives a request to initiate delayed billing. The request to initiate delayed billing is typically received from the server computer in connection with a binding request for an on-demand product from a consumer. From step 302, the process 300 proceeds to step 304. At step 304, the delayed-billing module ascertains delayed-billing settings that are applicable to the requested on-demand product. The delayed-billing settings may be acquired from one or more databases such as, for example, the one or more databases 112 of FIG. 1 or the one or more databases 212 of FIG. 2. From step 304, the process 300 proceeds to step 306.

At step 306, the delayed-billing module determines whether consumer authentication needs to be performed. In various embodiments, consumer authentication is a prerequisite to billing for certain types of on-demand products and is specified as such in the delayed-billing settings. Even if the delayed-billing settings specify consumer authentication, consumer authentication may not need to be performed because, for example, consumer authentication has already been performed as part of requesting the requested on-demand product. If it is determined that consumer authentication does not need to be performed, either because it is not required or because it has already been performed, the process 300 proceeds to step 312. If it is determined at step 306 that consumer authentication is required, the process 300 proceeds to step 308.

At step 308, the delayed-billing module performs consumer authentication. Examples of authentication that may occur at step 308 are described in U.S. Pat. No. 7,340,042 and U.S. patent application Ser. No. 13/093,664 (each of which is incorporated by reference above). From step 308, the process 300 proceeds to step 310. At step 310, the delayed-billing module determines whether the consumer authentication was successful. If it is determined at step 310 that the consumer was not successfully authenticated, the process 300 proceeds to step 322 and ends. If it is determined at step 310 that the consumer was successfully authenticated, the process 300 proceeds to step 312.

At step 312, the delayed-billing module determines whether the delayed-billing settings require delivery verification. If not, the process 300 proceeds to step 320. If it is determined at step 312 that the delayed-billing settings require delivery verification, the process 300 proceeds to step 314. At step 314, the delayed-billing module performs delivery verification. In a typical embodiment, the delivery verification involves evaluating one or more product-delivery factors contained within the delayed-billing settings. The one or more product-delivery factors can include, for example, whether the consumer has been successfully added to internal systems that provide, for example, a monitoring service, whether the on-demand product has been transmitted in its entirety to the consumer, whether the on-demand product is accessible to the consumer, and the like. From step 314, the process 300 proceeds to step 316.

At step 316, the delayed-billing module determines whether the delivery verification was successful. In a typical embodiment, the delivery verification is deemed successful if each of the one or more product-delivery factors evaluate to an expected value of true or false, as applicable. If the delivery verification was not successful, the process 300 proceeds to step 318. At step 318, the delayed-billing module delays billing the consumer for the requested on-demand product. In various embodiments, the delayed-billing process 300 is re-run later, for example, as a batch billing process for all unbilled consumers. From step 318, the process 300 proceeds to step 322 and ends.

If it is determined at step 316 that the delivery verification was successful, the process 300 proceeds to step 320. At step 320, the consumer is billed for the requested on-demand product. From step 322, the process 300 proceeds to step 322. At step 322, the process 300 ends.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method of delaying billing, the method comprising:
receiving, via an on-demand product provision system, a binding request from a consumer, wherein the on-demand product provision system comprises at least one server computer, and wherein the binding request comprises a selection of an on-demand identity product;
providing, by the on-demand product provision system, the on-demand identity product to the consumer prior to billing the consumer;
automatically determining after providing the on-demand identity product, by the on-demand product provision system, delayed-billing settings applicable to the binding request based at least in part on the selection, wherein the delayed-billing settings comprise consumer-authentication criteria and delivery-verification criteria;
after determining the delayed-billing settings, verifying, by the on-demand product provision system, an identity of the consumer based at least in part on personally identifying information of the consumer and the consumer-authentication criteria;
after determining the delayed-billing settings, verifying, by the on-demand product provision system, delivery of the on-demand identity product based on one or more product-delivery factors;
confirming, by the on-demand product provision system, that the consumer has been successfully authenticated and that the on-demand identity product was successfully delivered; and
billing, by the on-demand product provision system, the consumer for the on-demand identity product based on the confirmation.

2. The method of claim 1, wherein the consumer authentication criteria require that at least a portion of the personally identifying information be verified as correct prior to billing.

3. The method of claim 1, wherein the consumer authentication criteria require that the consumer be authenticated as owner of a set of personally identifying information prior to billing.

4. The method of claim 1, wherein:
the verifying of delivery comprises evaluating the one or more product-delivery factors.

5. The method of claim 1, wherein the one or more product-delivery factors are varied depending on whether the on-demand identity product is a credit product or a non-credit product.

6. The method of claim 1, wherein the on-demand identity product comprises a credit product.

7. The method of claim 6, wherein the one or more product-delivery factors require receipt of an acknowledgement from at least one credit bureau prior to billing.

8. The method of claim 1, wherein the on-demand identity product comprises a non-credit product.

9. The method of claim 8, wherein the one or more product-delivery factors require that the consumer be successfully added to receive a service prior to billing.

10. The method of claim 1, wherein the billing comprises authorizing a third party to charge the consumer.

11. An on-demand product provision system comprising:
at least one server computer, wherein the at least one server computer is operable to perform a method comprising:
receiving a binding request from a consumer, wherein the binding request comprises a selection of an on-demand identity product;
providing the on-demand identity product to the consumer prior to billing the consumer;
automatically determining after providing the on-demand identity product delayed-billing settings applicable to the binding request based at least in part on the selection, wherein the delayed-billing settings comprise consumer-authentication criteria and delivery-verification criteria;
after determining the delayed-billing settings, verifying an identity of the consumer based at least in part on personally identifying information of the consumer and the consumer-authentication criteria;
after determining the delayed-billing settings, verifying delivery of the on-demand identity product based on one or more product-delivery factors;
confirming that the consumer has been successfully authenticated and that the on-demand identity product was successfully delivered; and
billing the consumer for the on-demand identity product based on the confirmation.

12. The identity-product provision system of claim 11, wherein:
the verifying of delivery comprises evaluating the one or more product-delivery factors.

13. The identity-product provision system of claim 11, wherein the one or more product-delivery factors are varied depending on whether the on-demand identity product is a credit product or a non-credit product.

14. A computer-program product comprising a non-transitory computer-usable medium having computer-readable program code embodied therein, the computer-readable program code adapted to be executed to implement a method comprising:
receiving a binding request from a consumer, wherein the binding request comprises a selection of an on-demand identity product;
providing the on-demand identity product to the consumer prior to billing the consumer;
automatically determining after providing the on-demand identity product delayed-billing settings applicable to the binding request based at least in part on the selection, wherein the delayed-billing settings comprise consumer-authentication criteria and delivery-verification criteria;
after determining the delayed-billing settings, verifying an identity of the consumer based at least in part on personally identifying information of the consumer and the consumer-authentication criteria;
after determining the delayed-billing settings, verifying delivery of the on-demand identity product based on one or more product-delivery factors;
confirming that the consumer has been successfully authenticated and that the on-demand identity product was successfully delivered; and
billing the consumer for the on-demand identity product based on the confirmation.

\* \* \* \* \*

UNITED STATES PATENT AND TRADEMARK OFFICE
CERTIFICATE OF CORRECTION

PATENT NO. : 8,751,388 B1  
APPLICATION NO. : 13/870489  
DATED : June 10, 2014  
INVENTOR(S) : Isaac Chapa et al.

Page 1 of 1

It is certified that error appears in the above-identified patent and that said Letters Patent is hereby corrected as shown below:

In the Specification:

| Patent | Application File |
|---|---|
| Column 3, Line 67 | Replace "PIT, as used herein" with -- PII, as used herein -- |
| Column 4, Line 4 | Replace "PIT may include," with -- PII may include, -- |

Signed and Sealed this
Nineteenth Day of August, 2014

Michelle K. Lee
*Deputy Director of the United States Patent and Trademark Office*